United States Patent [19]

Mailfert

[11] 3,934,163
[45] Jan. 20, 1976

[54] POLYPHASE SYNCHRONOUS ELECTRICAL MACHINE WITH SUPERCONDUCTOR WINDING

[75] Inventor: Alain Mailfert, Morsang-sur-Orge, France

[73] Assignee: Agence Nationale de Valorisation de la Recherche (ANVAR), France

[22] Filed: Feb. 15, 1974

[21] Appl. No.: 443,015

[30] Foreign Application Priority Data
Feb. 21, 1973 France .............................. 73.06119

[52] U.S. Cl. .................... 310/10; 310/52; 322/100; 322/27
[51] Int. Cl.² ........................................ H02K 19/00
[58] Field of Search ................ 310/10, 52, 54, 112; 322/100, 27

[56] References Cited
UNITED STATES PATENTS
| | | | |
|---|---|---|---|
| 3,679,920 | 7/1972 | McNab et al. | 310/52 X |
| 3,742,265 | 6/1973 | Smith | 310/52 |

*Primary Examiner*—J. D. Miller
*Assistant Examiner*—Robert J. Hickey
*Attorney, Agent, or Firm*—Larson, Taylor and Hinds

[57] ABSTRACT

The machine comprises a rotary assembly comprising a hollow shaft containing the inductor, a passive screen for protecting the inductor against rapid variations in field due to disturbances in the armature. An auxiliary winding borne by the shaft creates a rotary magnetic field of intensity and frequency such that it completes the compensation of the magnetic fields created by the armature. The machine is useful for synchronous power alternators.

10 Claims, 4 Drawing Figures

POLYPHASE SYNCHRONOUS ELECTRICAL MACHINE WITH SUPERCONDUCTOR WINDING

The present invention relates to polyphase synchronous electrical machines and, more particularly, to high power polyphase synchronous electrical machines for converting mechanical power that they receive from a rotary shaft into electrical power in the form of alternating voltages and currents, although it is also applicable to synchronous motors.

Certain windings of a rotary electric machine have already been constituted by means of superconductors. Superconductors are in fact advantageous due to the fact that extremely high currents can circulate therein with very low losses and that, correspondingly, it is possible, for a given power, to have a minimum volume. On the other hand, the use of superconductors to constitute a winding implies the maintenance of the latter at very low temperature. When the mechanical power supplied to the machine must be transmitted entirely from the shaft to the rotating coil, direct coupling between the inductor coil and the shaft constitutes a thermal leakage path whose existance is manifested by the necessity of a very high powered cooling installation.

Moreover, superconducting materials have a magnetic hysteresis such that a release of heat is produced which is hardly compatible with maintenance at the low temperatures necessary for the preservation of the superconductivity when they are subjected to rapid or periodic variations of magnetic field. This property makes it difficult to constitute the armature of a superconductor. It also necessitates the taking of steps to limit the variations in the magnetic field of the armature caused by variations in load.

A solution already used consists of placing, between the inductor (or field) coil and the fixed windings (armature windings), a rotary screen, whose constitution is similar to that of dampers in conventional alternators. It can be for example a short-circuited winding which, in steady state condition, is not subject to any variation in flux and which is hence not the site of any current. It can also consist of conducting bars assembled as a squirrel cage. However such a screen, if it reduces in an efficient manner the magnetic fields, which rotate with respect to it at a high rotary frequency, is incapable of damping the magnetic fields within the low frequency range, due for example to cyclic variations in rotary speed of the inductor coil, of very low amplitude and of low frequency.

It is an object of the present invention to provide a polyphase synchronous electrical machine with a superconductor inductor coil which responds better to the exigencies of practice than prior superconducting winding rotary machines, especially in that it reduces considerably the variations in field to which the inductor coil is subject.

To this end, according to the invention, there is provided a synchronous polyphase electrical machine with a superconducting inductor coil, characterised particularly in that it comprises a rotary assembly comprising the inductor coil, separated from an armature by a passive shield and by an auxiliary winding in which a servocoupling circuit causes the flow of currents for creating a rotary magnetic field of such intensity and frequency that it compensates for the interfering fields of the armature in disturbed operation.

Any auxiliary winding constitution enabling the creation of a rotary field is utilisable. However, it is generally advantageous to use a winding constituted by two coils, of which one, which will in the following be called "transverse auxiliary winding," has for each phase a magnetic axis in quadrature with the magnetic axis of the inductor coil, and of which the other, which will in the following be called "longitudinal auxiliary winding," has a magnetic axis coincident with that of the inductor coil.

The auxiliary winding of the machine according to the invention enables the effect of the conventional passive screen to be completed, down to very low frequencies at which this passive screen is inoperative (down to several hertz). This auxiliary winding could even be entirely substituted for the passive screen, but without this arrangement representing an advantage, given that the passive screen gives satisfactory results at high frequencies and that, for the same frequencies, the servocoupling circuit must have a short time constant.

The invention is particularly applicable to electrical machines with a superconducting inductor coil in which this inductor coil is provided so that the torque which is exerted between a drive shaft and itself is very low. In this case, the inductor coil is only made fast to the shaft by means of low mechanical strength and on the other hand the servocoupling circuit is provided to cause the passage, in the transverse auxiliary winding, of a direct current of a value such that the torque transmitted between the shaft and the inductor coil is substantially nil. Consequently, the coupling means of the shaft and the inductor coil, being of low mechanical strength, can be constituted so as to have very low thermal conductivity, hence so as to reduce, to a very great extent, the drawback of the above-mentioned conventional alternators consisting of an excessive loss of cooling power through the coupling.

In this embodiment, the shaft is advantageously hollow and contains a cryostat in which the inductor coil is placed.

The invention is applicable to any synchronous electrical machine operating at low frequency, whether it relates particularly to the usual industrial frequencies (50 or 60 hertz) or to frequencies normally used for other applications, for example 400 hertz which is the frequency used in aviation.

The invention will be better understood on reading the description which follows of a synchronous electrical machine which constitutes a particular embodiment thereof, given by way of non-limiting example. The description refers to the accompanying drawings in which.

For greater simplicity, it will be considered in the following that the rotary machine described is a three-phase di-polar machine, but it must be well understood that the number of phases and the number of pairs of poles could be entirely different. This machine comprises a rotary assembly of generally cylindrical shape in which are arranged coaxially, from the axis of the machine, the inductor coil contained in a cryostat, the shaft which receives the motive power, a passive screen and an auxiliary winding. However, a different arrangement could be adopted and providing, for example, from the axis, the inductor coil, the auxiliary winding and the shield. There could also, although this solution seems less satisfactory, be used a solid shaft instead of a hollow shaft and the assembly of windings and passive shield placed around the shaft.

Figure 1:
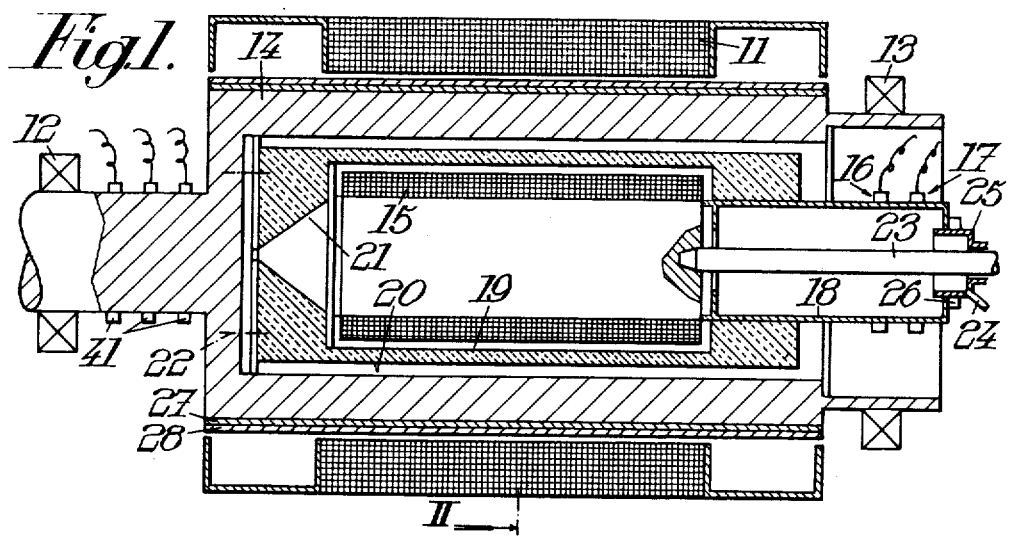
FIG. 1 shows an embodiment of the machine according to the invention, in very diagrammatic manner, in a section along a plane passing through its axis.

The machine illustrated in FIG. 1, constituting a synchronous alternator, has a general constitution similar to that of the machine described and claimed in U.S. patent application Ser. No. 412,127, filed Nov. 2, 1973 by applicant and whose teachings are herein incorporated by reference.

The alternator comprises a fixed frame 10 (FIG. 2) which bears a stator coil 11 and in which is mounted the rotary assembly. The stator winding is connected, for example, to a receiver network for electrical energy. It is constituted of an electrically good conducting material, for example copper or aluminum, operating the usual temperatures of armature coils of conventional alternators. On operation, the rotation of the inductor coil and that of the auxiliary winding of the rotary assembly which will be described below give rise in the armature 11 to electromotive forces.

The frame 10 carries, at its end, centering bearings 12 and 13 for a rotary hollow shaft 14. These bearings are sufficiently spaced from the armature and from the rotary assembly windings for the magnetic flux which passes through them to remain small.

The rotary assembly comprises a superconducting inductor winding 15. This winding, di-polar in the embodiment described, is traversed by the D.C. energizing current of the machine, which is constant under steady state conditions. This inductor winding 15 is formed according to the usual technology of superconducting magnets, so that it is not necessary to describe its constitution here in detail. The superconducting material can for example be of the composite multifilamentary type, associating elemental filaments of an alloy of niobium and of titanium buried in a matrix of copper and formed into wires of circular or rectangular cross-section. The suitably insulated elemental conductors are arranged, in sufficient number to ensure overall distribution of current resulting in a two-pole field, for example in grooves or notches formed at the periphery of a cylindrical mandrel 29. This mandrel 29 (FIG. 2) may be of steel (magnetic or amagnetic, the inductions being very high), of an insulating material or even of a metal having good mechanical strength and being a good heat conductor. If a plastics material is used, the latter is advantageously reinforced with fibres. Among the metallic products usable, there may be mentioned for example light aluminum based alloys. The inductor winding 15 and the mandrel which carries it are provided with cooling channels to enable the cryogenic fluid to circulate. The inductor winding 15 being subject to magnetic stresses due its own field and to mechanical stresses due to the centrifugal force on operation, it must be locked on the mandrel 29. This result can be achieved by using notch wedges of a material with good mechanical strength, or metallic bands, or again impregnation with a thermo-setting resin. The above methods may obviously be also used in combination.

The inductor winding 15 must be supplied with continuous current, at least during the period of starting. The current can be supplied either by a generator or driven by the shaft, associated with static rectifiers, or from the outside. It is this second solution which is illustrated by way of example in FIG. 1, which shows sliding contacts 16 and 17, comprising fixed brushes and rings borne by a jacket 18 attached to the mandrel supporting the inductor winding. The conductors connecting the sliding contacts to the inductor winding are situated inside the jacket; they must obviously be devised so as to reduce as much as possible the transmission of heat towards the low temperature zone.

Whatever the solution adopted to supply the inductor winding on increase in speed, this winding advantageously comprises a superconducting switch, open as long as the power increases in speed and which is closed under steady conditions so as to loop the inductor winding on itself and to trap the flux necessary for operation. At the same time, the supply can be interrupted.

The inductor winding is enclosed in a cryostat, comprising an internal wall 19 and an external wall 20. The inductor winding is fixed to the outer wall 20 of the cryostat by centering parts. These parts comprise, in the embodiment described, the jacket 18 and flanges 21. The outer wall 20 of the cryostat itself is centered in the shaft and fixed to the latter by members which must have as low a thermal conductivity as possible, which members are denoted at 22. On the other hand, these members can only have a very limited mechanical strength.

Between the cryostat and the shaft 14 there is provided a thermal insulation, which may be constituted in conventional manner by a double walled jacket under vacuum, or by a conventional super-insulating material. There may also be used, either separately, or jointly with the preceding devices, a screen at an intermediate temperature, for example traversed by liquid nitrogen at 77°K. The members 22 may be constituted of flanges or structural members with a symmetry of revolution of stainless steel with low thermal conductivity.

These connections can be of very small cross-section since, as will be seen, the inductor is only subject to a small torque tending to rotate it with respect to the shaft, and even nil under steady state conditions.

The cryostat itself must be provided with means for supply of fluid for maintaining cryogenic temperatures. In the diagrammatically illustrated embodiment, these means comprise a central pipe 23 which opens inside the mandrel bearing the inductor winding 15.

Through this pipe, cryogenic fluid is injected, which can be liquid helium or, even better, hypercritical helium. The vaporised helium returns into the space comprised between the pipe 23 and the jacket 18 (the latter being advantageously provided with heat insulation). The helium is evacuated through a pipe 24 which opens into a fixed collector 25, cooperating with the end surface of the jacket 18 through a rotary sealing joint 26.

The shaft 14 bears a passive electrical screen or shield 27 and an auxiliary winding 28. In the embodiment illustrated, these two members are placed outside the shaft, auxiliary winding on the outside. The shaft is selected of a material with a high mechanical strength, generally of magnetic or amagnetic steel. It can be provided with radial notches 30 open outwardly enabling the placing of windings constituting the screen 27 and the auxiliary winding 28.

The screen 27 can have the constitution used normally in alternators with a superconducting inductor to protect the superconducting material against variable interfering magnetic fields produced by disturbances in the armature or stator winding. This screen will generally be constituted by a short circuited winding, according to an arrangement identical with squirrel cages of asynchronous motors.

Figure 2:
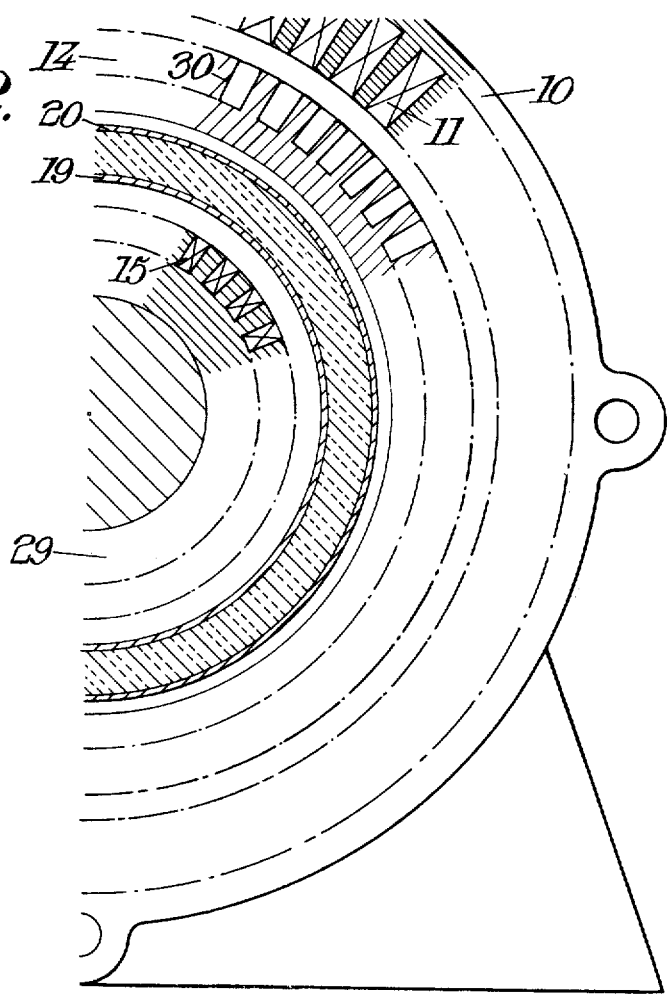
FIG. 2 is a partial diagrammatic view, on a larger scale, in section along the line II—II of FIG. 1 showing additional details.

In the embodiment illustrated in FIG. 2, this winding is placed in notches 30 of the shaft 14 which also receive the windings which constitute the auxiliary coil. For greater simplicity, only some notches are shown in FIG. 2.

Figure 3:
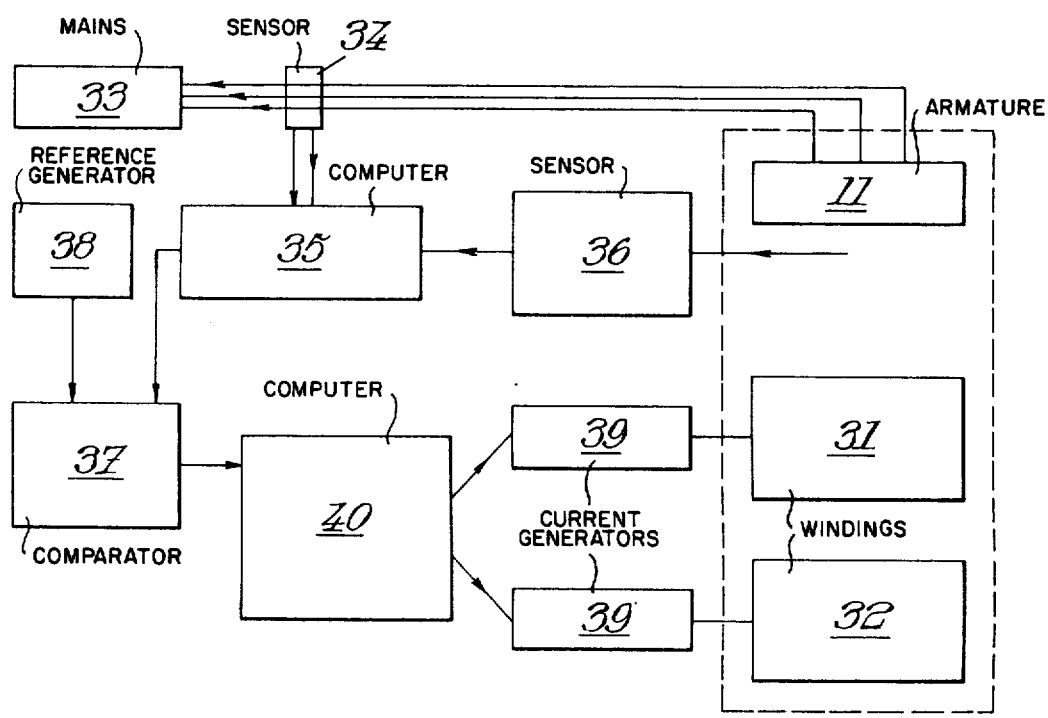
FIG. 3 is a simplified block diagram showing the servocoupling circuit which regulates the value of the current in the auxiliary winding.

The shaft also carries two windings of the auxiliary coil 28. It will be assumed in the following that one of these windings, called the longitudinal auxiliary winding, has its magnetic axis coincident with the magnetic axis of the superconducting inductor. This winding is denoted by 31 in the simplified block diagram of FIG. 3. The other winding, denoted by 32 in the block diagram of FIG. 3, is in electrical quadrature with the magnetic axis of the inductor and, for this reason, is called the transverse auxiliary winding. As has already been indicated above, this relative angular location of the two windings is not the only one which can be used, but has the advantage of leading to the simplest possible construction of the servocoupling circuit which regulates the currents so as to compensate for interfering fields due to the armature 11.

All of the windings of the secondary coil can be formed according to conventional winding techniques for turbo-alternator rotors. It is obviously necessary to reduce as much as possible the thickness of the assembly constituted by the auxiliary winding, the screen and the hollow shaft, to an extent compatible however with the forces to be withstood. The windings must be kept at a temperature compatible with the use of conventional electrical insulators and which limits the transfer of heat to the cryostat. Generally, water cooling will be used. However, cooling by cryogenic fluid at a temperature intermediate between the temperature of superconductivity and ambient temperature, could also be adopted. There could for example be used cooling by circulation of liquid nitrogen.

The windings 31 and 32 must be supplied by suitable currents. In the embodiment envisaged here, the longitudinal auxiliary winding is not supplied at undisturbed steady state, and the passive shield is likewise not traversed by any current. Given that it is sought to reduce to as low as possible the value the torques tending to rotate the inductor 15 with respect to the shaft 14, the transverse auxiliary winding 32 is then, on the contrary, supplied by D.C. current of intensity proportional to the active component of the current delivered to the armature winding of the alternator, the coefficient of proportionally being selected to cancel the torque acting on the inductor, whatever the electrical power supplied.

In case of faulty operation or in unbalanced conditions on the contrary, the servocoupling circuit causes the passage in the two windings 31 and 32 of the auxiliary winding, of currents intended to reduce the interfering magnetic field acting on the inductor 15 to a value compatible with suitable operation. In the embodiment illustrated, this result will be achieved by causing to pass in the longitudinal auxiliary winding 31, and by superposing on the continuous current in the transverse auxiliary winding 32, an alternating current, so as to create a rotary field of suitable amplitude and frequency.

The servocoupling circuit may have the constitution illustrated in principle in FIG. 3. The amplitude and phase of the alternating current supplied by the armature 11 to the mains 33 are measured by a conventional sensor apparatus 34 which supplies signals representative of the magnitude and phase of the current to a computer or processing network 35 the elements for determining the reaction field of the armature.

A tachometer and a sensor for sensing the angular offset of the inductor with respect to the rotary field of the armature 11 (field detector borne by the stator for example), shown diagrammatically at 36, supply a speed and displacement related input to the computer 35, in the form of analog electrical signals. From these elements, the computer 35, constituted by an analog computing system, for example, determines the principal periodic component of the reaction field of the armature. The formulae for the computation of this field being conventional, a suitable computer 35 is easily constructed with commercial analog computer units. A comparator 37, provided with a reference generator 38 for setting maximum acceptable values for the disturbances, that is, the values which are not to result in activation of the servocoupling, controls a computer or control network 40 which regulates current generators 39 which cause suitable currents to flow in the two windings 31 and 32.

The generators 39 can be external to the machine. In this case, as indicated in FIG. 3, the auxiliary winding is supplied by three sliding contacts 41 (or four if it is desired to avoid a common point). The sliding contacts can be constituted by carbon brushes rubbing on the metallic rings, or liquid metal contacts. Instead of external generators, there may obviously be used a generator driven by the shaft, provided with built-in static rectifiers.

The armature 11 is constituted by a distributed three phase two pole winding, constructed in conventional manner of a material which is a good conductor of electricity (copper or aluminum) vigorously cooled, for example by forced circulation of water. The conductors must be sub-divided and transposed to minimise losses by eddy-currents.

A servocoupling circuit having a different constitution from that illustrated in FIG. 3 can be used, the only condition being that it determines the periodic components of the reaction field of the armature (or at least the principal component) and supplies to the windings 31 and 32 the necessary currents for the required compensation.

A circuit constituting a modification of that of FIG. 3 is shown wherein corresponding, or similar, elements are given the same numbers with primes attached. The circuit comprises, at 34', current transformers which supply to the computer 35' signals proportional to the momentary value of the currents $i_a$, $i_b$, $i_c$ supplied by the armature 11' and the angular frequency $\omega$ of these currents.

Figure 4:
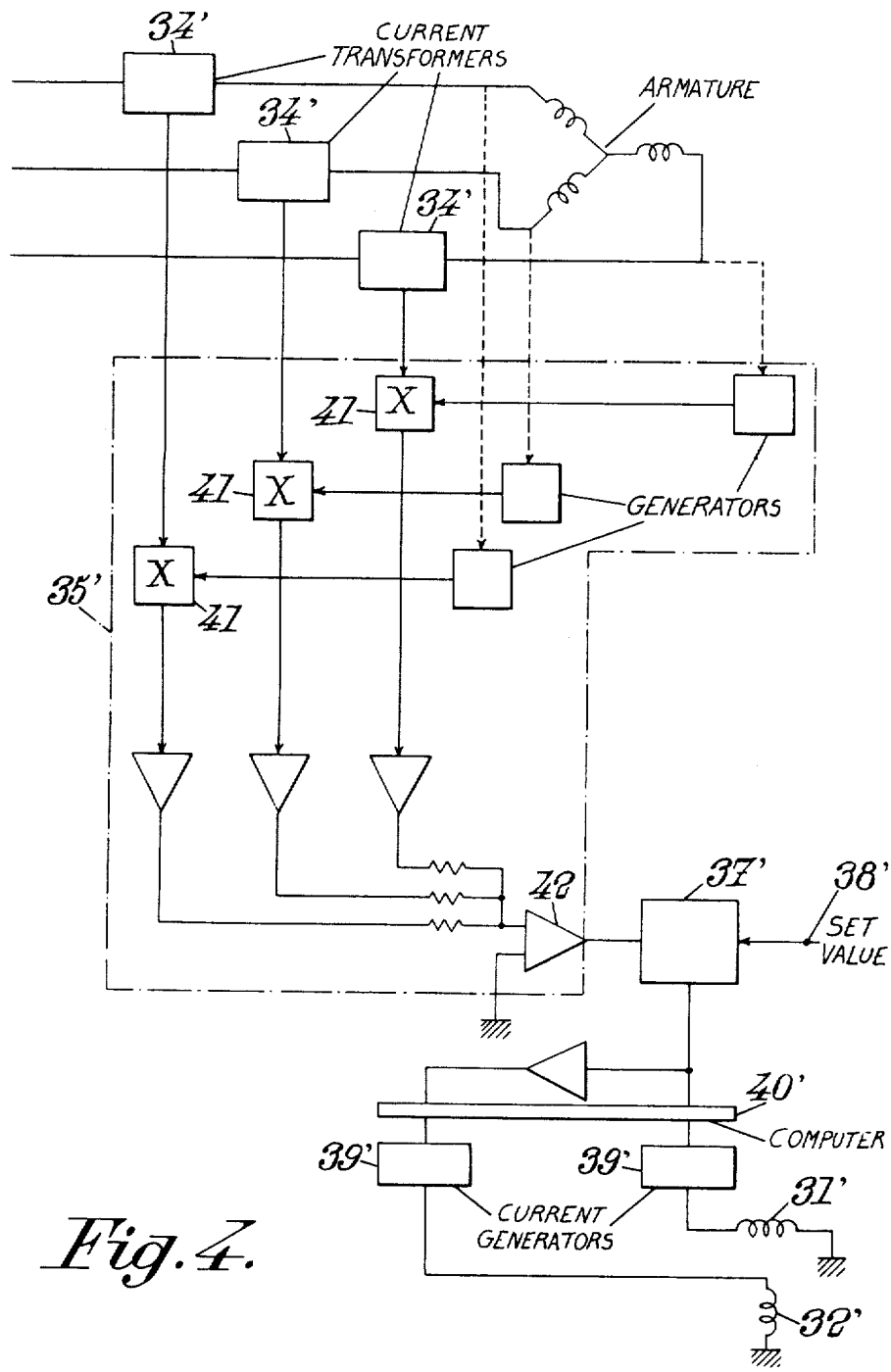
FIG. 4 is an alternative embodiment of the circuit of FIG. 3.

The device 36 of FIG. 3 is omitted in FIG. 4 and the computer 35' comprises three multipliers 41 (Hall effect probes for example) which supply the product of $i_a$, $i_b$, $i_c$ respectively by a corresponding sinusoidal signal whose angular frequency is $\omega$. This sinusoidal signal, supplied by a generator provided in the computer 35', has an amplitude proportional to the fundamental term of the harmonic distribution analysis of the armature conductors (which is a constructional characteristic of the alternator and is substantially the same for the three phases) and is out of phase by 90° with respect to the voltage at the terminals of the winding supplying the corresponding signal $i$. For each current $i_a$, $i_b$, or $i_c$, the corresponding multiplier supplies a signal which comprises a constant term and (when the alternator is in unbalanced state) a component whose angular frequency is $2\omega$. The three $2\omega$ components obtained from the currents $i_a$, $i_b$ and $i_c$ are summed, for example by means of an operational amplifier 42 connected as an adder. The sum obtained gives the amplitude and the phase of the angular frequency component $2\omega$ of the reaction field of the armature applied to the inductor. These data are transmitted to the comparator 37' which transmits them to the computer 40' if the amplitude exceeds the value set at terminal 38'. The computer 40' then controls the current generators 39' by multiplying the signal received from comparator 37' for the one, this signal displaced by 90° for the other, by a constant proportionality coefficients which are equal if the windings 31' and 32' are identical, and whose value is fixed by the characteristics of the alternator.

The windings 31' and 32', located at 90° with respect to each other and dipolar if the inductor is also dipolar, thus cooperate to provide a rotary field, with an angular frequency $2\omega$ with respect to the inductor field, which compensates for the effect of the component at the same frequency of the disturbances on the inductor.

I claim:

1. Polyphase synchronous electrical machine comprising polyphase stator coil means for conducting A.C. armature currents, a rotary assembly comprising a superconducting D.C. inductor winding, a shaft for transmitting mechanical power and polyphase auxiliary windings for providing a rotary field when conducting polyphase A.C. currents and circuit means for circulating, in response to unbalance of said polyphase armature currents, currents in said auxiliary windings to create a rotating magnetic field of such amplitude as to substantially compensate for the low frequency variations of the armature reaction field in unbalanced operation.

2. Electrical machine according to claim 1, wherein said polyphase windings comprise a first winding which has for each phase a magnetic axis in quadrature with the magnetic axis of the inductor and a second winding which has a magnetic axis coincident with that of the inductor.

3. Electrical machine according to claim 2 wherein said circuit means comprise means for causing a D.C. current to circulate in the quadrature auxiliary winding which creates a field substantially cancelling the torque tending to cause the inductor winding to rotate with respect to said shaft, the inductor winding being nonrotatably connected to the shaft.

4. Electrical machine according to claim 3, wherein the inductor is connected to the shaft by means having slight mechanical strength and high thermal resistance.

5. Electrical machine according to claim 3, wherein the shaft is hollow and a cryostat containing the inductor is placed inside the shaft.

6. Electrical machine according to claim 4, wherein the shaft is hollow and a cryostat containing the inductor is placed inside the shaft.

7. Electrical machine according to claim 1, wherein the rotary assembly comprises a passive electrically conducting shield for protecting the inductor.

8. Electrical machine according to claim 7, wherein the shaft bears the shield and the auxiliary windings which separate the inductor from the stator coil means.

9. Polyphase synchronous electrical machine comprising:
   polyphase stator coil means for producing a field rotating about an axis when polyphase alternating currents circulate therein;
   a superconducting D.C. inductor winding, mounted for rotation about said axis, for providing a rotating, at least bipolar magnetic field;
   a power shaft rotatably mounted about said axis and nonrotatably connected to said inductor winding for transmission of mechanical power;
   first and second auxiliary windings carried by said shaft and having different phase displacements with respect to the magnetic axis of the inductor;
   and means for circulating in said auxiliary windings A.C. currents of such magnitude as to compensate for the low frequency variations in the reaction field of the stator coil means of the inductor in unbalanced operation.

10. Polyphase synchronous electrical machine as claimed in claim 9 wherein said first auxiliary winding has, for each phase, a magnetic axis in quadrature with the magnetic axis of the inductor winding and said second auxiliary winding has, for each phase, a magnetic axis coincident with the magnetic axis of the inductor winding.

* * * * *